US011158073B2

(12) United States Patent
Schmidt et al.

(10) Patent No.: US 11,158,073 B2
(45) Date of Patent: Oct. 26, 2021

(54) SYSTEM FOR IMAGE COMPOSITING INCLUDING TRAINING WITH CUSTOM SYNTHETIC DATA

(71) Applicant: Weta Digital Limited, Wllington (NZ)

(72) Inventors: Tobias B. Schmidt, Wellington (NZ); Erik B. Edlund, Wellington (NZ); Dejan Momcilovic, Wellington (NZ); Josh Hardgrave, Wellington (NZ)

(73) Assignee: WETA DIGITAL LIMITED, Wellington (NZ)

( * ) Notice: Subject to any disclaimer, the term of this patent is extended or adjusted under 35 U.S.C. 154(b) by 0 days.

(21) Appl. No.: 17/133,429

(22) Filed: Dec. 23, 2020

(65) Prior Publication Data
US 2021/0241474 A1    Aug. 5, 2021

Related U.S. Application Data

(63) Continuation of application No. 17/081,843, filed on Oct. 27, 2020.

(60) Provisional application No. 62/968,041, filed on Jan. 30, 2020, provisional application No. 62/968,035, filed on Jan. 30, 2020.

(51) Int. Cl.
*G06T 7/00* (2017.01)
*G06T 7/50* (2017.01)
(52) U.S. Cl.
CPC ...... *G06T 7/50* (2017.01); *G06T 2207/20081* (2013.01); *G06T 2207/20084* (2013.01)

(58) Field of Classification Search
CPC ............. G06T 7/50; G06T 2207/20084; G06T 2207/20081
See application file for complete search history.

(56) References Cited

U.S. PATENT DOCUMENTS

| 2011/0025853 | A1* | 2/2011 | Richardson | H04N 5/247 348/159 |
|---|---|---|---|---|
| 2020/0193623 | A1* | 6/2020 | Liu | G06T 7/50 |
| 2021/0004976 | A1* | 1/2021 | Guizilini | G06K 9/6257 |
| 2021/0065379 | A1* | 3/2021 | Zhang | G06F 9/3877 |

OTHER PUBLICATIONS

Alex Kendall et al.; "End-To-End Learning of Geometry and Context for Deep Stereo Regression"; 10 pages.

(Continued)

*Primary Examiner* — Ping Y Hsieh
(74) *Attorney, Agent, or Firm* — Trellis IP Law Group, PC

(57) ABSTRACT

Embodiments allow live action images from an image capture device to be composited with computer generated images in real-time or near real-time. The two types of images (live action and computer generated) are composited accurately by using a depth map. In an embodiment, the depth map includes a "depth value" for each pixel in the live action image. In an embodiment, steps of one or more of feature extraction, matching, filtering or refinement can be implemented, at least in part, with an artificial intelligence (AI) computing approach using a deep neural network with training. A combination of computer-generated ("synthetic") and live-action ("recorded") training data is created and used to train the network so that it can improve the accuracy or usefulness of a depth map so that compositing can be improved.

20 Claims, 4 Drawing Sheets

(56) References Cited

OTHER PUBLICATIONS

Jiahao Pang et al.; "Cascade Residual Learning: A Two-stage Convolutional Neural Network for Stereo Matching"; 9 pages.
Sameh Khamis et al,; "StereoNet: Guided Hierarchical Refinement for Real-Time Edge-Aware Depth Prediction", 2018, arXiv:1807.08865; 18 pages.
Olaf Ronneberger et al,; "U-Net: Convolutional Networks for Biomedical Image Segmentation", 2015, arXiv:1505.04597; 8 pages.
Yinda Zhang et al,; "Physically-Based Rendering for Indoor Scene Understanding Using Convolutional Neural Networks", CVPR paper provided by the Computer Vision Foundation; 9 pages.

* cited by examiner

SYSTEM FOR IMAGE COMPOSITING INCLUDING TRAINING WITH CUSTOM SYNTHETIC DATA

CROSS REFERENCES TO RELATED APPLICATIONS

This application is a continuation of U.S. patent application Ser. No. 17/081,843, entitled SYSTEM FOR IMAGE COMPOSITING INCLUDING TRAINING WITH SYNTHETIC DATA, filed on Oct. 27, 2020, which claims the benefit of U.S. Provisional Patent Application Ser. No. 62/968,041, entitled SYSTEM USING ARTIFICIAL INTELLIGENCE TO GENERATE A DEPTH MAP INCLUDING TRAINING WITH SYNTHETIC DATA, filed on Jan. 30, 2020; and from U.S. Provisional Patent Application Ser. No. 62/968,035, entitled METHOD FOR GENERATING PER PIXEL DEPTH INFORMATION, filed on Jan. 30, 2020; which are all hereby incorporated by reference as if set forth in full in this application for all purposes.

This application is related to the following applications: U.S. patent application Ser. No. 17/018,943, entitled COMPUTER-GENERATED IMAGE PROCESSING INCLUDING VOLUMETRIC SCENE RECONSTRUCTION filed Sep. 11, 2020, which claims priority to U.S. Provisional Application No. 62/983,530 entitled COMPUTER-GENERATED IMAGE PROCESSING INCLUDING VOLUMETRIC SCENE RECONSTRUCTION filed Feb. 28, 2020, which are hereby incorporated by reference as if set forth in full in this application for all purposes.

BACKGROUND

Many visual productions (e.g., movies, video) use a combination of real and digital images. For example, a live actor may be in a scene with a computer-generated ("CG," or merely "digital") charging dinosaur. An actor's face may be rendered as a monster. An actress may be rendered as a younger version of herself, etc. In order to allow the creators (i.e., director, actors) of the live action scenes to better interact with and utilize the digital models it is desirable to provide the live action creators with a close approximation of what the final composited imagery will look like at the time of recording, or "shooting," the live action scenes.

Since recording live action occurs in real time and often requires many "takes" it is useful to be able to generate the composited imagery in real time, or near real-time, so that an on-set assessment of the recorded takes can be made. This approach also allows the human creators to more accurately interact with and react to the digital imagery.

However, such real-time processing to composite the CG with live action is often difficult because of the large amount of data involved and due to the computing difficulty of accurately matching depth information between the live action and CG images. For example, it is necessary to determine depths (e.g., distance from camera) of elements in a live action scene in order to accurately composite the live action elements with CG images in a realistic way.

SUMMARY

One embodiment uses one or more auxiliary, or "depth," cameras to obtain stereo depth information of live action images. Each auxiliary camera outputs a standard RGB or grayscale image for purposes of comparing the different views to obtain depth information (although other cameras or sensors can be used such as infrared (IR) or RGBIR, time-of-flight, LIDAR, etc.). The depth information is correlated to picture images from a main image capture device (e.g., a main cinema camera sometimes referred to as a "hero" camera or "picture" camera) that captures the same live action as the auxiliary cameras. The raw auxiliary camera images are subjected to various steps such as one or more of pre-processing, disparity detection, feature extraction, matching, reprojection, infilling, filtering, and other steps. The result of the steps is a depth map that is then aligned to the image from the picture camera. In an embodiment, each picture element (pixel) in the picture camera's image is provided with a depth value. This allows elements or objects in the picture image to be accurately integrated with a CG image. CG elements may be integrated into live action images or vice versa. The resulting composite image is then displayed and shows the live action accurately composited with the CG elements. Although the auxiliary cameras are described as dedicated and distinct from the picture camera, in other embodiments depth information can be computed from any two or more cameras including using the picture camera described herein.

In an embodiment, steps of one or more of feature extraction, matching, filtering or refinement can be implemented, at least in part, with an artificial intelligence (AI) computing approach using a deep neural network with training. A combination of computer-generated ("synthetic") and live-action ("recorded") training data is created and used to train the network so that it can improve the accuracy or usefulness of a depth map so that compositing can be improved.

DETAILED DESCRIPTION OF EMBODIMENTS

Figure 1:
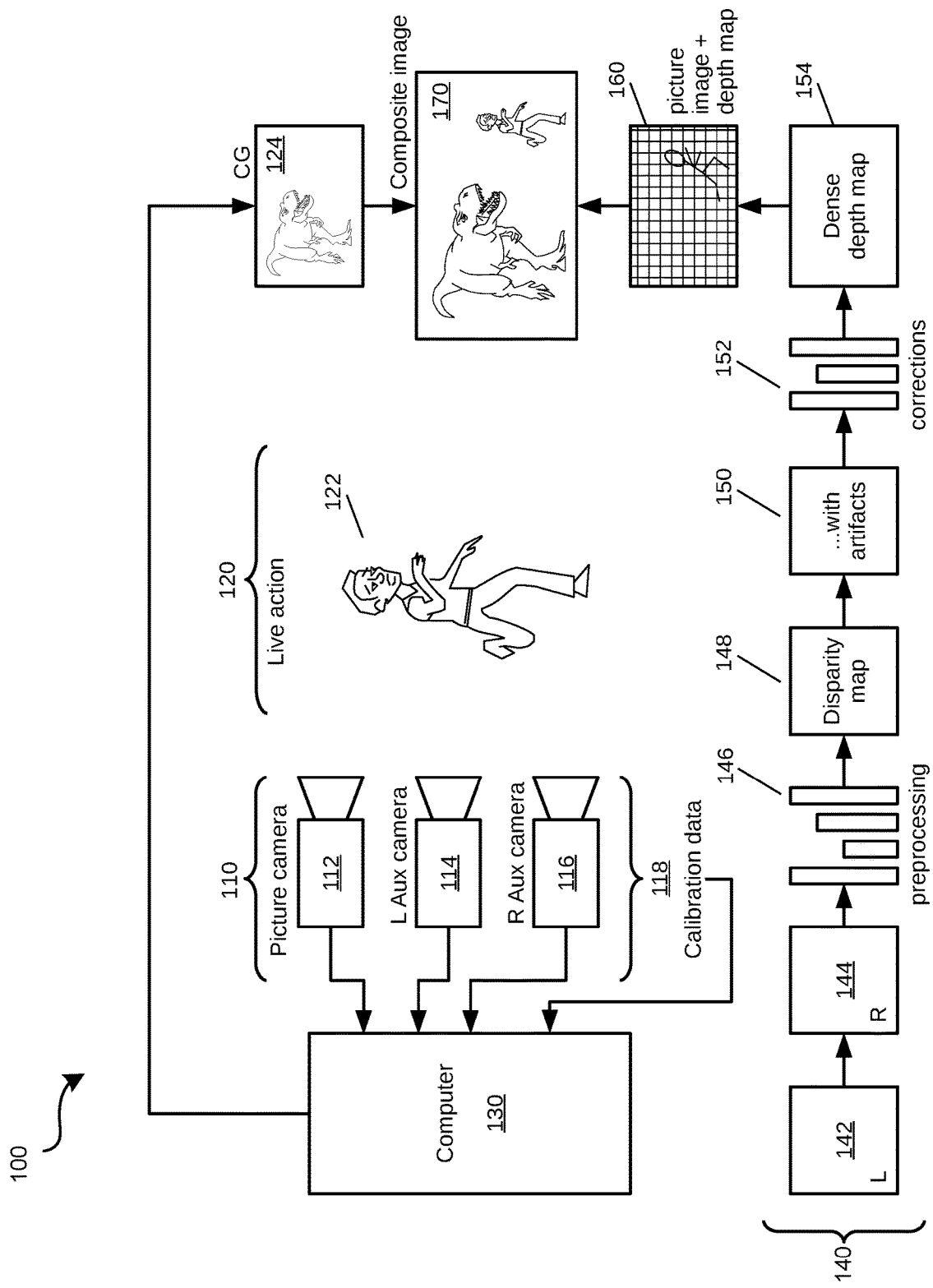
FIG. 1 illustrates basic components and steps of an embodiment.

Embodiments allow live action images from a picture camera to be composited with computer generated images in real-time or near real-time. The two types of images (live action and computer generated ("CG")) are composited accurately by using a depth map. The depth map includes a "depth value" for each pixel in the live action, or picture, image. In an embodiment, the depth value is defined as the distance between the picture camera origin and a plane that is perpendicular to the picture camera viewing direction. In other embodiments, the depth value can be referenced from a different camera or defined location; and calculated to a desired plane or point. In other embodiments, the depth can be with respect to a different reference point. Also, in some embodiments not all of the pixels need be mapped with a depth value. Rather, depth values may only need to be mapped for a region of interest. For example, parts of a scene can be masked out (greenscreen, etc.); the background may be ignored (i.e., distances past a certain value or plane), objects, or distance ranges can be identified, etc. so that they do not need to be depth-mapped to the same degree or at all. A degree of tolerance or accuracy may similarly be non-uniform over a picture image, or frame, so that areas of focus (e.g., an actor's face; an action, etc.) can be provided with heightened depth accuracy over other areas in a frame of the picture camera.

In an embodiment, the compositing process is performed in real-time. That is, each frame is composited so that it is ready for display at a standard frame rate being used for playback (e.g., 30 or 24 frames per second, etc.). It is desirable to reduce any delay between an image acquisition and display of a composited image. One embodiment achieves a delay in the range of 2 to 4 frames at a predetermined framerate. This allows the team shooting the live action to be able to view the composited images essentially concurrently with the recording of the live action and enables a director, cinematographer, actors, special effects persons, etc., to coordinate the live action more effectively with the computer-generated images. This approach also allows the composited images, or portions thereof, to be used with standard flat panel monitors, augmented reality, virtual reality, or other types of visual output devices. In other embodiments, frames may be skipped, or dropped, or the compositing modified to be slower than real time while still achieving desired functionality. Various aspects of the features described herein may be useful at other times or places such as in a post production facility.

In an embodiment, a dataset is received that includes a plurality of images and depths of objects in an environment. The dataset is used to train a deep neural network to assist, at least in part, in generating a depth map for use in real-time compositing of a live action recording taking place in the environment. Functionality described herein can be implemented using various programming techniques unless otherwise indicated. Functionality can be performed by one or more computers or processors executing instructions to control the processors or computers. The instructions may be provided on a machine-readable medium. The processor or computer-readable medium can comprise a non-transitory storage medium, such as solid-state memory, a magnetic disk, optical disk etc., or a transitory medium such as a signal transmitted over a computer network.

In an embodiment, one or more images from the one or more auxiliary cameras are processed to generate a depth map for elements of a picture image from a camera. The depth map is correlated with at least a portion of picture elements in at least one picture image received from a picture camera using the correlated depth map to composite one or more digital elements with one or more picture elements. In a stereo approach, depths of the picture elements are determined by using two or more images from two or more auxiliary cameras to generate a depth map. The depth map is correlated with at least a portion of picture elements in at least one of the picture images, and the correlated depth map is used to composite one or more digital elements with one or more picture elements. The compositing may be performed by one or more processors or computer systems. Processor-implementable instructions to control the processor or computer to perform one or more steps of the method may be provided on a machine (e.g., processor or computer-readable) medium. The computer-readable medium can comprise a non-transitory storage medium, such as solid-state memory, a magnetic disk, optical disk etc., or a transitory medium such as a signal transmitted over a computer network. In other approaches, depth information may be obtained by any one or more other cameras or other types of sensing devices. For example, multiple pairs of machine-vision cameras can be used at different locations and orientations on a set. The main imaging camera (also called a "hero" camera or a "picture" camera) can include a stereo pair of cameras for 3D filming. Single cameras or other sensors can be used to obtain depth information. Examples of such cameras and sensors are described in, for example, U.S. patent application Ser. No. 17/018,943, referenced above.

FIG. 1 illustrates basic components and steps of a system to perform real-time compositing of live action images with computer-generated images.

FIG. 1 illustrates basic components and steps of a system to perform real-time compositing of live action images with computer-generated images. The term "real-time" as used to describe depth map generation, processing and use in compositing, includes "near real-time" where there is a short delay or lag in processing. Since the depth map generation starts at the same time as, or slightly after, the capture of a picture frame, the depth map will not be available until after the captured frame is available.

In FIG. 1, system 100 includes a live action camera rig 110. Camera rig 110 includes picture camera 112 and left and right auxiliary cameras 114 and 116, respectively. In the system illustrated in FIG. 1, depth information is obtained by using left and right stereo view cameras in order to calculate the depth of each pixel in an image or frame captured by picture camera 112. In an embodiment, the picture camera is at 2K resolution and the auxiliary cameras are at 2k resolution. In other embodiments varying resolutions for the cameras may be used. One approach uses resolutions adequate so that the auxiliary camera frames can be used to compute a depth map for each pixel in a frame of an image from the picture camera. During shooting, all 3 cameras are maintained in fixed positions with respect to each other. The cameras can be mounted on a common physical structure, for example. Depending on the cinematic needs of the shot, the cameras may be stationary, mounted on a boom or dolly, handheld, etc. In general, any suitable arrangement or configuration of cameras may be used. In other embodiments a fixed arrangement between cameras may not be necessary such as if the relative arrangement of cameras is otherwise known or defined.

In other embodiments, other approaches to obtain depth information may be used. For example, structured light, time-of-flight, photogrammetry, etc. techniques may be employed. One or more auxiliary cameras may be used. Other variations are possible.

In general, the live action camera rig is used to record live action such as moving actors, vehicles or other objects. However, the live action scene need not require movement. Even where the camera changes position within an inanimate setting, or even where the camera and scene are static, the accuracy of compositing is important for the creators of the film or video to have confidence that they have achieved the desired shot.

The picture image and the left and right depth images, also referred to as "frames," are provided to computer system 130. Computer system 130 is merely a representation of various computing resources that can be used to perform the process actions and steps described below. Any number and type of discrete or integrated hardware and software components may be used. The components may be located local to, or remote from, the cameras as, for example, interlinked by one or more networks.

Calibration data 118 from the camera rig is also sent to the computer system. This data can include the relative positions of the cameras to each other, lens information (focal length, aperture, magnification, etc.) rig position and orientation, or other data useful to calibrate the multiple sets of images being generated.

Computer system 130 can either generate images or retrieve previously stored computer graphic images such as frame 124. Since the CG images are created based on computer models, all of the depth information is already defined for each of their elements. The remaining steps of FIG. 1 are needed to quickly and accurately determine depth information for elements in the picture camera image in order that the live action image can be accurately placed "into" (i.e., composited with) the CG image.

In FIG. 1, steps or acts at 140 are used to generate a depth map that includes depth information for each pixel of the image from the picture camera.

Left image 142 from left auxiliary camera 114, together with right image 144 from right auxiliary camera 116 are processed at 146. This pre-processing compares the differences, or "disparity," between the images' to generate disparity map 148. The disparity processing can use known or future methods based on parallax effects, modeling, training, lighting or other characteristics of the images. Computation can use machine learning approaches such as artificial neural networks. Other techniques can be used. Disparity processing may remove distortions and unwanted camera or lens effects and other image anomalies.

Disparity map 148 is then re-projected onto the picture image using camera calibration data. In this operation, the resulting disparity map may have artifacts, such as "holes," "gaps," or other types of discontinuities in its image and depth information, as represented at 150. As a result, corrections processing 152 may be necessary to correct the artifacts. In an embodiment, an artificial intelligence process is used to perform infilling and densification to remove holes.

The result of correcting artifacts (if necessary) is dense depth map 154. In an embodiment, the dense depth map is at the same or higher resolution than the picture image so that it can be mapped to the picture image to provide a depth for each pixel in the picture image. This picture image plus depth map is shown as output 160. The output 160 is then composited with CG image 124 to produce composite image 170 where the live action image is properly placed into the CG image based on the derived depth information from steps 140.

Using the dense depth map, various items in the CG image will be properly placed and masked behind items in the live action image or vice versa. Additional features can be provided in the compositing, such as to allow making objects transparent or semi-transparent in order to see image items that would otherwise be occluded. The correct placement of live action elements in depth can assist in the use of transparency in the CG. Similarly, additional features or effects such as shadowing/lighting (e.g. CG object drops shadow on live action actor) can be generated and composited more realistically.

Figure 2:
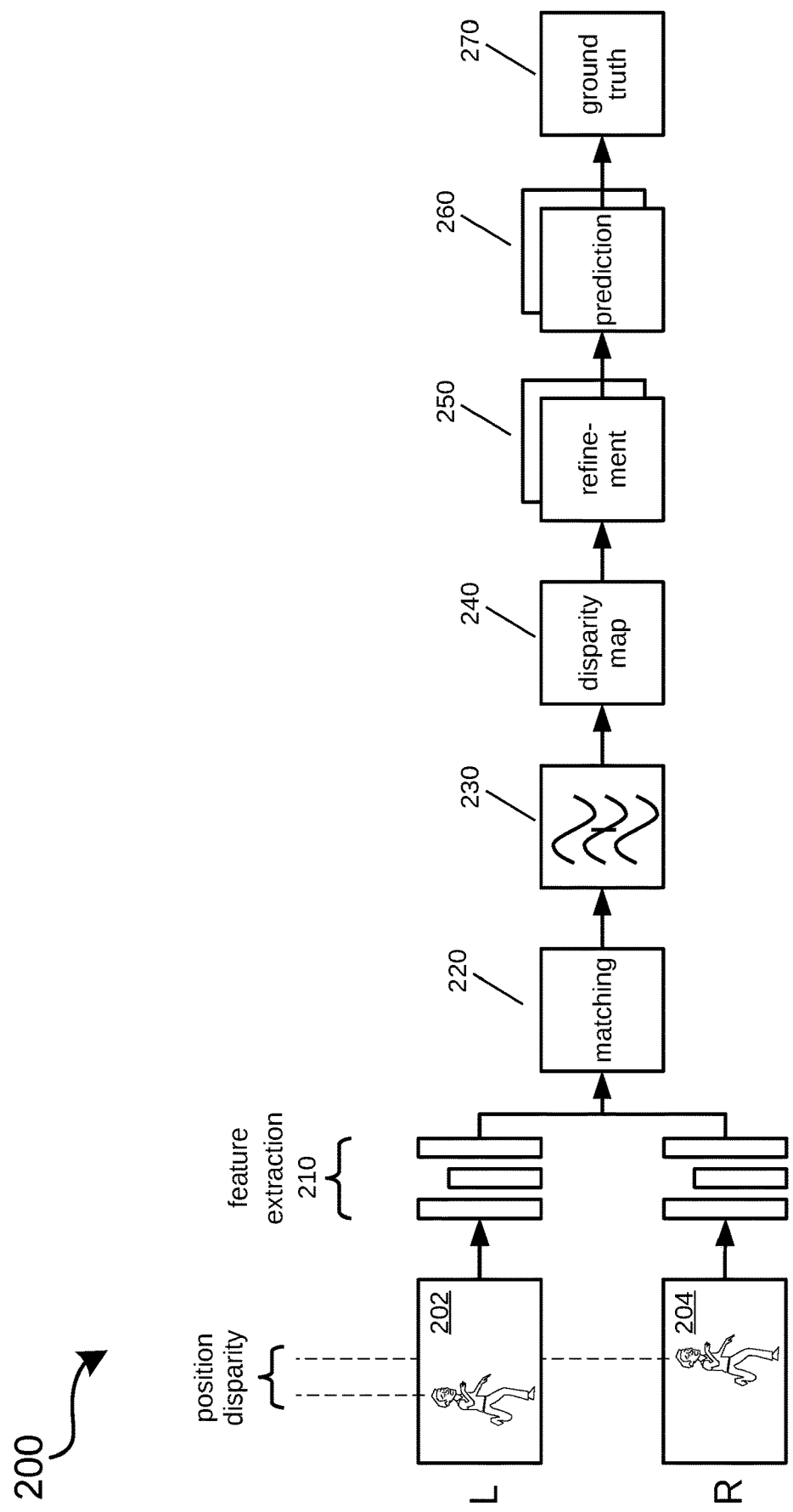
FIG. 2 shows basic sub-steps in pre-processing.

FIG. 2 shows basic sub-steps in pre-processing step 146 of FIG. 1.

In an embodiment, deep neural network techniques are used to implement one or more of the steps of FIG. 2. In other embodiments, other programming techniques may be used instead of, or in addition to, the specifics described herein. For example, other artificial intelligence approaches can be employed such as those known in the field of machine learning, or otherwise. In applications where specific hardware (e.g., graphics processing units (GPUs), application-specific integrated circuits (ASICs), custom or semi-custom processors, etc.), is used to accelerate computation it may be useful to include legacy approaches to problem solving such as procedural or "brute force" techniques. In other embodiments, any of a number of deep learning architectures currently known or yet to be devised, may be employed. For example, deep belief networks, recurrent neural networks, convolutional neural networks, etc., may be used.

In FIG. 2, the pre-processing determines differences among the same parts or features of items in the left and right auxiliary camera images. The features may be large or small depending on the degree of interest or importance to the ultimate compositing, and depending on the image area occupied by the feature. For example, a feature may be a person, an eye, eyelash, etc. At step 210, feature maps from the 202 and 204 images are extracted. At step 220 feature maps are compared to determine same features in the depth images. Step 230 applies convolution filtering to achieve coarse volumetric placement and matching at a low resolution (240).

At step 250 refinement is then performed at high resolution using the original position disparity images to check and adjust how the modeled scene with coarse depths can be more precisely positioned in depth dimension. Step 260 shows a predicted image that can be used to "train" the system when compared to ground truth mapping 270 ("recorded" or "synthetic" data). The system uses silhouettes or outlines of the objects and encourages correct alignment of the outlines to reduce hops or jumps in pixel images from frame to frame so that the final rendered sequence is continuous.

Color images and depth maps are used as reference data, such as ground truth 270 data, to compare generated or predicted frames (such as predicted frames at 260) and correct the model so that predicted frames are closer to the training data obtained. Training data can be based on recorded or synthetic data. In one embodiment, synthetic training data is based on LIDAR or photogrammetric scans of actors and objects on the actual set. In other embodiments synthetic data can be obtained in any suitable manner.

Figure 3:
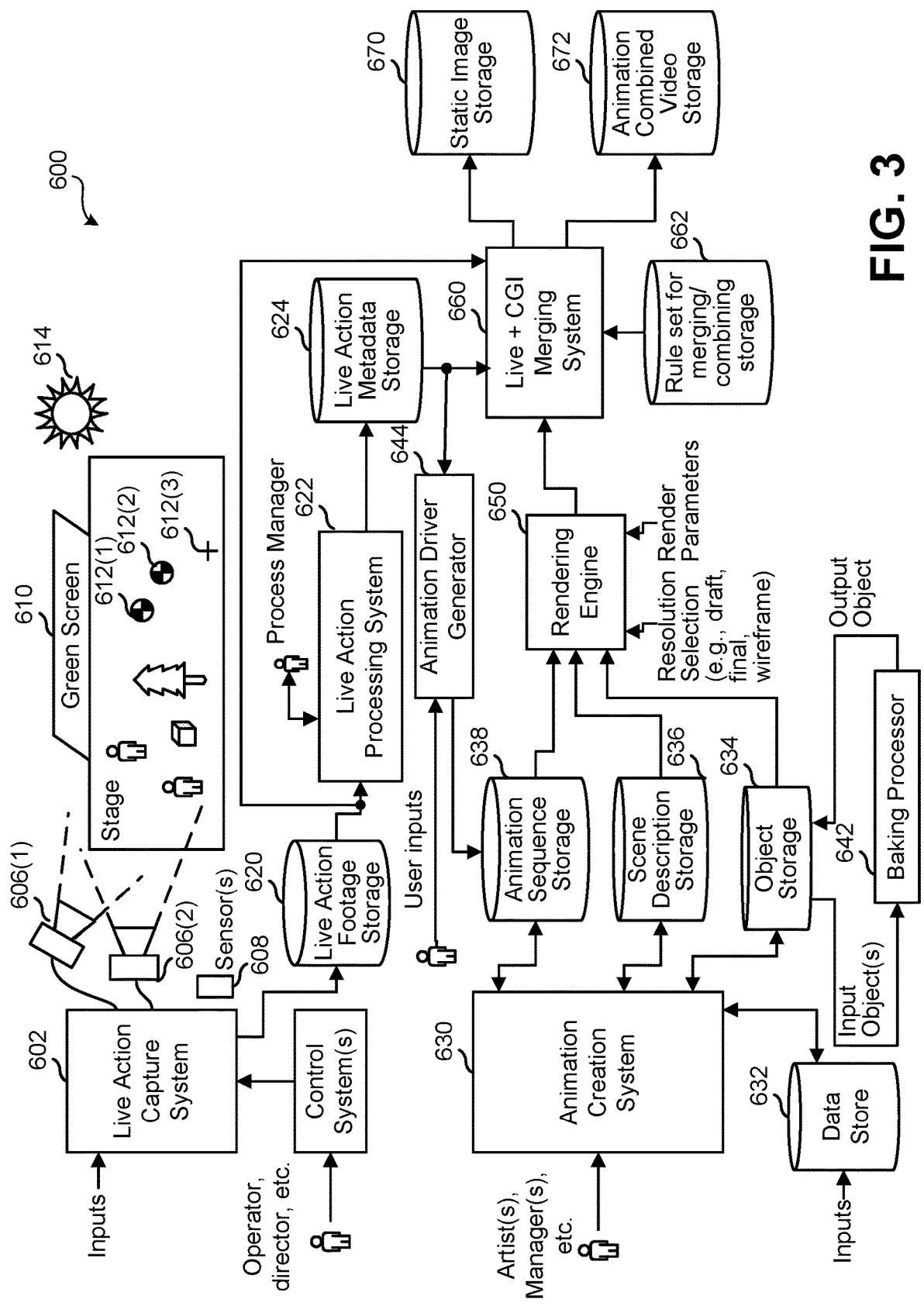
FIG. 3 illustrates an example of visual content generation system.

The sequence of steps in FIG. 2 for pre-processing to generate an improved disparity map can also be used to improve disparity map with artifacts 150 of FIG. 1. The picture image can be combined with disparity map with artifacts 150. In other words, each of steps 250-270 may be applied to an initial disparity map with artifacts such as 150 of FIG. 1 to generate an improved disparity map without artifacts As illustrated in FIG. 3, a live action capture system 602 captures a live scene that plays out on a stage 604. The live action capture system 602 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 606(1) and 606(2) capture the scene, while in some systems, there might be other sensor(s) 608 that capture information from the live scene (e.g., infrared cameras, infrared sensors, motion capture ("mo-cap") detectors, etc.). On the stage 604, there might be human actors, animal actors, inanimate objects, background objects, and possibly an object such as a green screen 610 that is designed to be captured in a live scene recording in such a way that it is easily overlaid with computer-generated imagery. The stage 604 might also contain objects that serve as fiducials, such as fiducials 612(1)-(3), that might be used post-capture to determine where an object was during capture. A live action scene might be illuminated by one or more lights, such as an overhead light 614.

During or following the capture of a live action scene, the live action capture system 602 might output live action footage to a live action footage storage 620. A live action processing system 622 might process live action footage to generate data about that live action footage and store that data into a live action metadata storage 624. The live action processing system 622 might include computer processing capabilities, image processing capabilities, one or more processors, program code storage for storing program instructions executable by the one or more processors, as well as user input devices and user output devices, not all of which are shown. The live action processing system 622 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of the overhead light 614, as that might be useful in post-processing to match computer-generated lighting on objects that are computer-generated and overlaid on the live action footage. The live action processing system 622 might operate autonomously, perhaps based on predetermined program instructions, to generate and output the live action metadata upon receiving and inputting the live action footage. The live action footage can be camera-captured data as well as data from other sensors.

An animation creation system 630 is another part of the visual content generation system 600. The animation creation system 630 might include computer processing capabilities, image processing capabilities, one or more processors, program code storage for storing program instructions executable by the one or more processors, as well as user input devices and user output devices, not all of which are shown. The animation creation system 630 might be used by animation artists, managers, and others to specify details, perhaps programmatically and/or interactively, of imagery to be generated. From user input and data from a database or other data source, indicated as a data store 632, the animation creation system 630 might generate and output data representing objects (e.g., a horse, a human, a ball, a teapot, a cloud, a light source, a texture, etc.) to an object storage 634, generate and output data representing a scene into a scene description storage 636, and/or generate and output data representing animation sequences to an animation sequence storage 638.

Scene data might indicate locations of objects and other visual elements, values of their parameters, lighting, camera location, camera view plane, and other details that a rendering engine 650 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 630 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 634 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from the data store 632 might be used to drive object presentation. For example, if an artist is creating an animation of a spaceship passing over the surface of the Earth, instead of manually drawing or specifying a coastline, the artist might specify that the animation creation system 630 is to read data from the data store 632 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 644 might read in live action metadata, such as data representing movements and positions of body parts of a live actor during a live action scene. The animation driver generator 644 might generate corresponding animation parameters to be stored in the animation sequence storage 638 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 622. The animation driver generator 644 might convert that movement data into specifications of how joints of an articulated CGI character are to move over time.

A rendering engine 650 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. The rendering engine 650 might include computer processing capabilities, image processing capabilities, one or more processors, program code storage for storing program instructions executable by the one or more processors, as well as user input devices and user output devices, not all of which are shown.

The visual content generation system 600 can also include a merging system 660 that merges live footage with animated content. The live footage might be obtained and input by reading from the live action footage storage 620 to obtain live action footage, by reading from the live action metadata storage 624 to obtain details such as presumed segmentation in captured images segmenting objects in a live action scene from their background (perhaps aided by the fact that the green screen 610 was part of the live action scene), and by obtaining CGI imagery from the rendering engine 650.

A merging system 660 might also read data from rulesets for merging/combining storage 662. A very simple example of a rule in a ruleset might be "obtain a full image including a two-dimensional pixel array from live footage, obtain a full image including a two-dimensional pixel array from the rendering engine 650, and output an image where each pixel is a corresponding pixel from the rendering engine 650 when the corresponding pixel in the live footage is a specific color of green, otherwise output a pixel value from the corresponding pixel in the live footage."

The merging system 660 might include computer processing capabilities, image processing capabilities, one or more processors, program code storage for storing program instructions executable by the one or more processors, as well as user input devices and user output devices, not all of which are shown. The merging system 660 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 660, such as modifying boundaries of segmented objects, inserting blurs to smooth out imperfections, or adding other effects. Based on its inputs, the merging system 660 can output an image to be stored in a static image storage 670 and/or a sequence of images in the form of video to be stored in an animated/combined video storage 672.

Thus, as described, the visual content generation system 600 can be used to generate video that combines live action with computer-generated animation using various components and tools, some of which are described in more detail herein. While the visual content generation system 600 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 4:
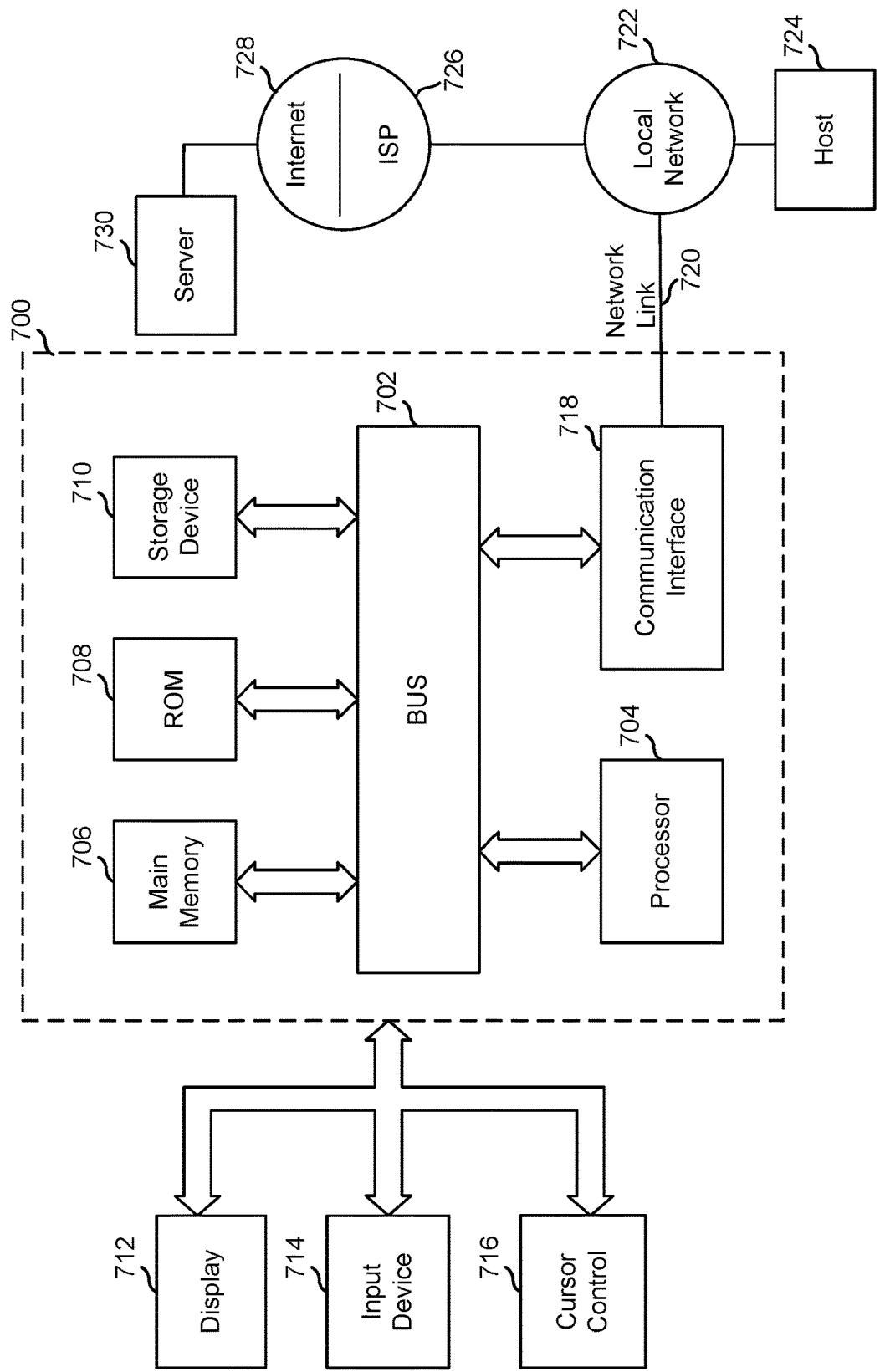
FIG. 4 shows a block diagram illustrating an example computer system adaptable for use with functions described herein.

For example, FIG. 4 is a block diagram that illustrates a computer system 700 upon which the computer systems of the systems described herein and/or the visual content generation system 600 (see FIG. 3) may be implemented. The computer system 700 includes a bus 702 or other communication mechanism for communicating information, and a processor 704 coupled with the bus 702 for processing information. The processor 704 may be, for example, a general-purpose microprocessor.

The computer system 700 also includes a main memory 706, such as a random-access memory (RAM) or other dynamic storage device, coupled to the bus 702 for storing information and instructions to be executed by the processor 704. The main memory 706 may also be used for storing temporary variables or other intermediate information during execution of instructions to be executed by the processor 704. Such instructions, when stored in non-transitory storage media accessible to the processor 704, render the computer system 700 into a special-purpose machine that is customized to perform the operations specified in the instructions.

The computer system 700 further includes a read only memory (ROM) 708 or other static storage device coupled to the bus 702 for storing static information and instructions for the processor 704. A storage device 710, such as a magnetic disk or optical disk, is provided and coupled to the bus 702 for storing information and instructions.

The computer system 700 may be coupled via the bus 702 to a display 712, such as a computer monitor, for displaying information to a computer user. An input device 714, including alphanumeric and other keys, is coupled to the bus 702 for communicating information and command selections to the processor 704. Another type of user input device is a cursor control 716, such as a mouse, a trackball, or cursor direction keys for communicating direction information and command selections to the processor 704 and for controlling cursor movement on the display 712. This input device typically has two degrees of freedom in two axes, a first axis (e.g., x) and a second axis (e.g., y), that allows the device to specify positions in a plane.

The computer system 700 may implement the techniques described herein using customized hard-wired logic, one or more ASICs or FPGAs, firmware and/or program logic which in combination with the computer system causes or programs the computer system 700 to be a special-purpose machine. According to one embodiment, the techniques herein are performed by the computer system 700 in response to the processor 704 executing one or more sequences of one or more instructions contained in the main memory 706. Such instructions may be read into the main memory 706 from another storage medium, such as the storage device 710. Execution of the sequences of instructions contained in the main memory 706 causes the processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 710. Volatile media includes dynamic memory, such as the main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 702. Transmission media can also take the form of acoustic or light waves, such as those generated during radio-wave and infra-red data communications.

Various forms of media may be involved in carrying one or more sequences of one or more instructions to the processor 704 for execution. For example, the instructions may initially be carried on a magnetic disk or solid-state drive of a remote computer. The remote computer can load the instructions into its dynamic memory and send the instructions over a network connection. A modem or network interface local to the computer system 700 can receive the data. The bus 702 carries the data to the main memory 706, from which the processor 704 retrieves and executes the instructions. The instructions received by the main memory 706 may optionally be stored on the storage device 710 either before or after execution by the processor 704.

The computer system 700 also includes a communication interface 718 coupled to the bus 702. The communication interface 718 provides a two-way data communication coupling to a network link 720 that is connected to a local network 722. For example, the communication interface 718 may be a network card, a modem, a cable modem, or a satellite modem to provide a data communication connection to a corresponding type of telephone line or communications line. Wireless links may also be implemented. In any such implementation, the communication interface 718 sends and receives electrical, electromagnetic, or optical signals that carry digital data streams representing various types of information.

The network link 720 typically provides data communication through one or more networks to other data devices. For example, the network link 720 may provide a connection through the local network 722 to a host computer 724 or to data equipment operated by an Internet Service Provider (ISP) 726. The ISP 726 in turn provides data communication services through the world-wide packet data communication network now commonly referred to as the "Internet" 728. The local network 722 and Internet 728 both use electrical, electromagnetic, or optical signals that carry digital data streams. The signals through the various networks and the signals on the network link 720 and through the communication interface 718, which carry the digital data to and from the computer system 700, are example forms of transmission media.

The computer system 700 can send messages and receive data, including program code, through the network(s), the network link 720, and communication interface 718. In the Internet example, a server 730 might transmit a requested code for an application program through the Internet 728, ISP 726, local network 722, and communication interface 718. The received code may be executed by the processor 704 as it is received, and/or stored in the storage device 710, or other non-volatile storage for later execution.

In addition to generating recorded and synthetic datasets from the actual movie set on which the filming is to take place, generic datasets may be obtained of unrelated sets or environments. Any one or more of these types of data, or mixtures or combinations of data; can be combined into a "training dataset," used to improve the later real-time depth detection during a live-action shoot so that digital images can be more accurately composited onto, e.g., a director's camera viewfinder or an actor's virtual or augmented reality headset; in order to show what the final, composited, scene will look like.

In an embodiment, custom synthetic data is obtained by capturing key aspects of the actual set or environment that will be used in an upcoming live action shoot where views of composite CG and live action are desired to be presented in real time. Actors and costumes can be captured in various poses and positions on the set. Other characteristics of the physical set and environment can be captured such as lighting, object positionings, camera view positioning and settings, camera noise, etc.

Once captured, the custom recorded data is imported into a computer graphics rendering program so that the objects may be digitally repositioned. Lighting and noise or other effects can be added or subtracted in the digital images. Actors can be posed and placed along with various props and effects, if desired. Selected images of these synthesized views can be captured along with their depth information. In an embodiment, only the synthetic data obtained from custom recorded data is used to comprise the training dataset. However, in other embodiments, any desired combinations of recorded, custom recorded and/or synthetic data can be used. One embodiment uses semi-synthetic data where one or a few recorded data instances are used to generate many synthetic instances.

Although it can be beneficial to create the dataset using data recorded from the actual set to be used ("custom recorded data"), in other embodiments a dataset may be pre-compiled from recorded data from one or more unrelated sets or environments. This pre-compiled dataset can then be used to train a deep neural network to be used for real-time compositing when live-action shooting occurs in a different setting, environment or location.

In one embodiment, a training dataset is synthesized from custom recorded data from scanning an actual set to be used in a future shoot. The training dataset is then used to train a deep neural network to improve the depth mapping of images in real time when the future shoot is undertaken. Details of known procedures for training using datasets are provided in, e.g., reference Yinda Zhang et al,; "Physically-Based Rendering for Indoor Scene Understanding Using Convolutional Neural Networks", CVPR paper provided by the Computer Vision Foundation.

A machine learning training approach includes starting with random weights. Predictions are made by the network. The differences between the predicted and actual depths are computed and the weights are changed to make the prediction closer according to a scoring function. This is repeated until suitable training has been achieved for a threshold number of images. The size of the training dataset may vary widely, such as from one or a few to hundreds of thousands or millions of images.

In an embodiment, higher importance is assigned to edges or silhouettes of objects.

Depending on the resolution of the images, and number of images in the dataset, and other factors, training can take from hours up to one or more weeks. Evaluation of the effectiveness of the training can be performed visually by a human operator after an initial automatic evaluation, although in other embodiments the training evaluation actions can be automated in different arrangements including wholly manual or wholly automated. An operator interface is provided to allow a human to change settings. During the live action filming an operator can change settings on the auxiliary cameras (used to capture depth disparity information). Camera positions (distance apart), gain, brightness or other characteristics can be adjusted to improve the depth map generation. Differently trained neural networks can be available for an operator to switch from.

Data can be recorded at higher resolution for areas of interest such as human faces, furniture, etc. Information about the actual shoot can be used such as "X's" placed on the floor where actors will stand. Those areas can be subjected to more dense recording or synthesizing of data. Conversely, if it is known that areas of the set or environment will not be used then those areas can be the subject of less attention, or might be ignored entirely, for the training dataset.

One approach allows adding camera noise into the synthesized images in order to better train for the real camera images that will be handled as inputs during the live action shooting. Actual measured noise levels of cameras are used as target levels. Frequency response analysis of camera noise characteristics can be performed and those characteristics matched in the synthetic data for better training.

In an embodiment, the processing time to match a depth map to a live-action frame can be shortened by the use of a pre-stored camera parameters so that when a camera setting (e.g., focal length, etc.) is changed in the main picture camera, the corresponding change in the camera's frame captures can be applied to the depth map. Any suitable programming and/or database retrieval technique may be used. In an embodiment, a look-up table is used that includes pre-computed values for the effect of changes in the main camera settings on the resulting captured images. For example, if there is a focal length change at the main camera a lookup table entry corresponding to the new focal length is used and applied to the depth map in order that the depth map be modified ("distorted") in the same way as the captured main images. This approach can similarly be used for changes in other camera parameters.

Embodiments may also employ a human operator to visually inspect, in real-time, the depth map "fitting" to the captured main images and to make visual adjustments. The operator can have x, y and z (depth) adjustments and can fit the depth map to the captured image by panning and scrolling and zooming. Other controls can be provided to the operator. A combination of automated and manual matching tools can be provided at an operator interface. These approaches can be used at any one or more of the steps shown in FIG. 1 or 2.

Although the description has been described with respect to particular embodiments thereof, these particular embodiments are merely illustrative, and not restrictive. Controls can be provided to allow modifying various parameters of the compositing at the time of performing the recordings. For example, the resolution, number of frames, accuracy of depth position may all be subject to human operator changes or selection.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Some embodiments are implemented as processor implementable code provided on a computer-readable medium. The computer-readable medium can comprise a non-transitory storage medium, such as solid-state memory, a magnetic disk, optical disk etc., or a transitory medium such as a signal transmitted over a computer network.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for compositing image elements, the method comprising:
   (a) during preparation:
      obtaining custom recorded data of an aspect of an environment to be used during a live action capturing event;
      modifying the aspect in a computer program to create a rendering of a modified environment;
      generating custom synthetic data from the modified environment;
      selecting a deep neural network and training the selected deep neural network using a dataset derived, at least in part, from the custom synthetic data;
   (b) during the live action capturing event:
      using the selected deep neural network to process image information from one or more auxiliary cameras to generate a depth map of the environment;
      correlating the depth map with at least a portion of picture elements in at least one picture image of the environment obtained from an image capture device; and
      using the correlated depth map to composite one or more digital elements with one or more picture elements.

2. The method of claim 1, further comprising:
   re-projecting a disparity map into an image from the image capture device; and
   infilling holes in the re-projected disparity map.

3. The method of claim 1, further comprising:
a signal interface for receiving image camera information and providing the image camera information to one or more processors for processing by the selected deep neural network.

4. The method of claim 3, wherein the image camera information includes a focal length of an image camera.

5. An apparatus for compositing image elements, the apparatus comprising:
one or more digital processors;
a tangible, non-transitory processor-readable medium including instructions for:
(a) during preparation:
obtaining custom recorded data of an aspect of an environment to be used during a live action capturing event;
modifying the aspect in a computer program to create a rendering of a modified environment;
generating custom synthetic data from the modified environment;
selecting a deep neural network and training the selected deep neural network using a dataset derived, at least in part, from the custom synthetic data;
(b) during the live action capturing event:
using the selected deep neural network to process image information from one or more auxiliary cameras to generate a depth map of the environment;
correlating the depth map with at least a portion of picture elements in at least one picture image of the environment obtained from an image capture device; and
using the correlated depth map to composite one or more digital elements with one or more picture elements.

6. The apparatus of claim 5, further comprising:
re-projecting a disparity map into an image from the image capture device; and
infilling holes in the re-projected disparity map.

7. The apparatus of claim 5, further comprising:
a signal interface for receiving image camera information and providing the image camera information to one or more processors for processing by the selected deep neural network.

8. The apparatus of claim 7, wherein the image camera information includes a focal length of an image camera.

9. A tangible, non-transitory processor-readable medium including instructions executable by one or more digital processors for compositing image elements, the processor-readable medium comprising one or more instructions for:

(a) during preparation:
receiving custom recorded data of an aspect of an environment to be used during a live action capturing event;
modifying the aspect in a computer program to create a rendering of a modified environment;
generating custom synthetic data from the modified environment; and
creating a training dataset derived, at least in part, from the custom synthetic data, wherein the training dataset is suitable for training a deep neural network to process image information from one or more auxiliary cameras to generate a depth map of the environment.

10. The tangible, non-transitory processor-readable medium of claim 9, further comprising:
re-projecting a disparity map into an image from the image capture device.

11. The tangible, non-transitory processor-readable medium of claim 10, further comprising:
infilling holes in the re-projected disparity map.

12. The tangible, non-transitory processor-readable medium of claim 9, further comprising:
a signal interface for receiving image camera information and providing the image camera information to one or more processors for processing by the selected deep neural network.

13. The tangible, non-transitory processor-readable medium of claim 12, wherein the image camera information includes a focal length of an image camera.

14. The tangible, non-transitory processor-readable medium of claim 9, wherein an aspect includes at least a portion of a movie set.

15. The tangible, non-transitory processor-readable medium of claim 9, wherein an aspect includes at least a portion of a costume.

16. The tangible, non-transitory processor-readable medium of claim 9, wherein an aspect includes at least a portion of an actor.

17. The tangible, non-transitory processor-readable medium of claim 9, wherein an aspect includes lighting.

18. The tangible, non-transitory processor-readable medium of claim 9, wherein an aspect includes an object's position.

19. The tangible, non-transitory processor-readable medium of claim 18, wherein the object includes a camera.

20. The tangible, non-transitory processor-readable medium of claim 9, wherein an aspect includes a camera setting.

\* \* \* \* \*